Dec. 26, 1933.  T. W. CASE ET AL  1,941,431
METHOD OF TREATING TREES AND THE PRODUCT THEREOF
Filed Aug. 25, 1932
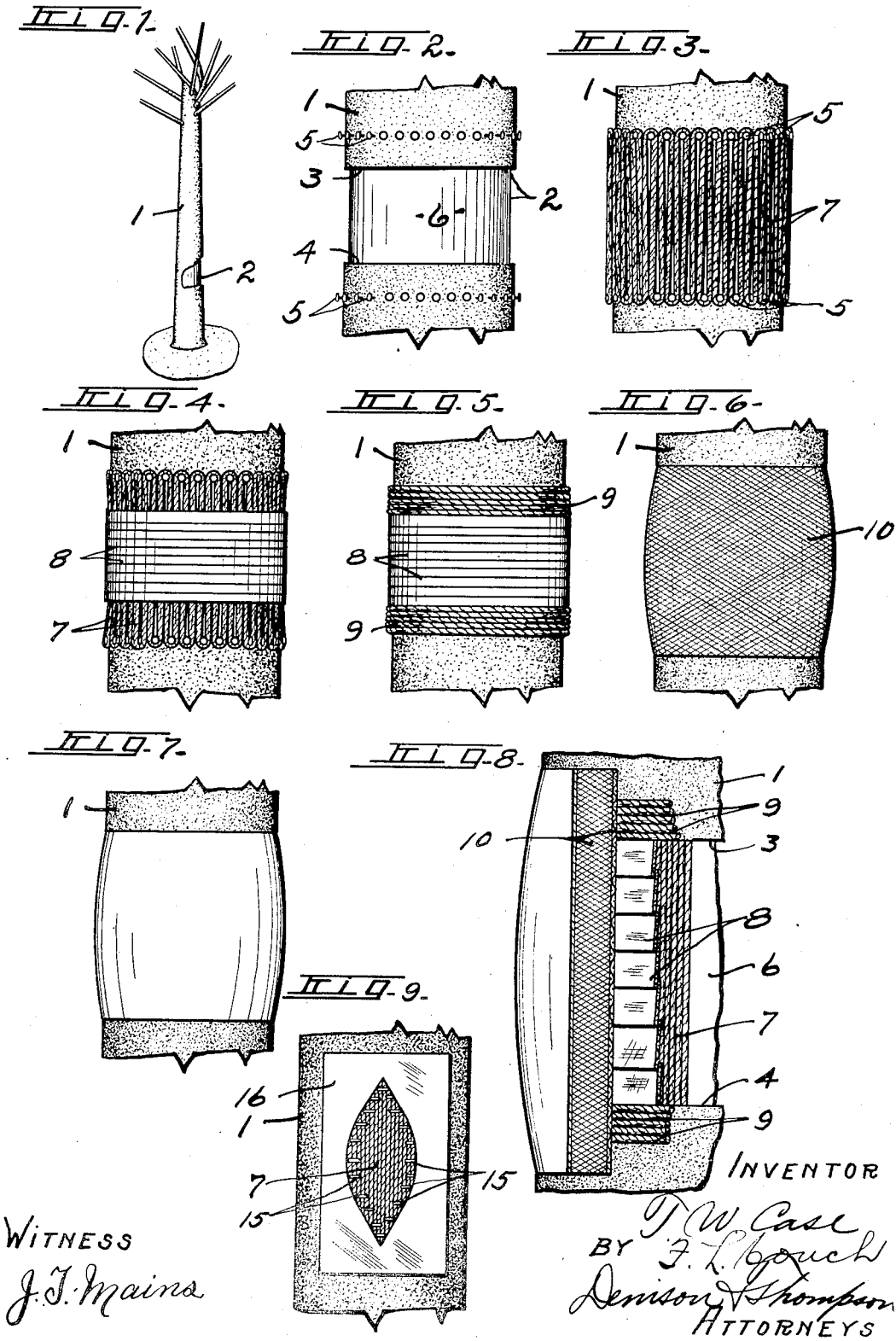

Patented Dec. 26, 1933

1,941,431

UNITED STATES PATENT OFFICE 1,941,431

METHOD OF TREATING TREES AND THE PRODUCT THEREOF

Theodore Willard Case and Frank Le Grande Couch, Auburn, N. Y., assignors to Case Research Laboratory, Inc., Auburn, N. Y., a corporation of New York Application August 25, 1932. Serial No. 630,432

9 Claims. (Cl. 47—8)

This invention relates to a certain new and improved method of treating trees and the product thereof and is a continuation in part of application Serial No. 565,578, filed September 28, 1931.

It frequently happens that from one cause or another, a section of bark is removed from a tree, as for instance, animals may even completely girdle a tree by gnawing off the bark around the entire circumference. In the latter case, the tree will shortly die. Further, where a section of bark is removed from one side of a tree, the limbs on that side of the tree are apt to die or at least deteriorate and the symmetry of the tree is lost. These results are doubtless due to the fact that the bark of the tree constitutes the means of communication for transfer of sap, etc., from roots to branches, and vice versa.

Further, it is known that girdling a tree or a portion thereof such as a limb, will cause the girdled tree or limb to grow more rapidly. The leaves become larger and greener. It almost seems as though a girdled tree or limb, in fear of approaching death, is supplied by nature with additional stimulant. However, girdling as previously used, has not involved the removal of the bark, but merely cutting through the bark around the tree and has not been extensively used for the reason that many trees or limbs, when girdled, actually die and the process is, therefore, extermely dangerous.

We have discovered a method of tree surgery applicable to trees from which a section of bark has been removed or which have been girdled and by means of which such tree or limb will not only be maintained alive even if entirely girdled but also will grow faster, the leaves will become larger and greener than normal. Further, this method provides a means for causing non-symmetrical trees to become symmetrical. For illustration, if the limbs upon one side of the tree are not as large as those upon another, it is only necessary to apply the method of this application to such limb or limbs so as to cause them to grow more rapidly so as to balance up the extension of the limbs from the tree upon all sides and cause the tree to assume symmetrical form.

Further, it has been found in actual practice that new bark will grow in the space from which it has been removed so that nature, operating in connection with this invention, tends to actually cure the girdled or wounded tree.

Further, this method provides an accessible and efficient means for supplying a tree with a medicine such as iron or copper, or a dye.

This method involves the use or production of what may be called an artificial bark or bark substitute which acts to transfer sap, etc. from the roots to the branches, and vice versa, in much the same manner as the natural bark of the tree. Further, the invention involves means for maintaining the artificial bark in position and in a water-tight, air-tight compartment.

Further, the invention includes the bark substitute positioned and maintained as hereinafter described and preferably enclosed in a manner hereinafter described as a unitary article associated with a tree.

Other objects and advantages relate to the details of the method and to the product thereof, all as will more fully appear from the following description taken in connection with the accompanying drawing, in which:—

Figure 1 is an elevation of a tree from which a section of bark has been removed.

Figure 2 illustrates a section of the tree such as that shown in Figure 1, prepared for the reception of a bark substitute.

Figure 3 is a view similar to Figure 2 illustrating the next step in the process.

Figures 4, 5, 6 and 7 are views similar to Figure 3 illustrating successive steps in the method.

Figure 8 is a broken-away sectional view of a portion of a tree which has been treated in the manner illustrated and described with respect to Figure 7.

Figure 9 is a front view of a modified form of partial girdle.

In Figure 1 there is illustrated more or less diagrammatically, a tree 1 from which a section of the bark has been removed at 2. In such case, it may be desirable to completely girdle the tree for the reception of the bark substitute of this invention. On the other hand, it may not be necessary to completely encircle the tree by cutting away the bark. In either case it is preferable to prepare the section of the tree from which the bark has been removed in the manner shown in Figure 2, the bark being cut away to preferably provide a straight upper edge or shoulder 3 and a straight lower edge or shoulder 4. Not only should the bark be cut away, but the underlying cambium layer should also be removed from the wood of the tree.

When so prepared, as illustrated in Figure 2, a row of tacks or small nails 5 are driven into the bark closely adjacent the shoulders 3 and 4. In the drawing some distance has been left between the nails and the edge of the bark. This is illustrative only and it is preferable to place the nails or tacks close to the edge of the bark.

These nails or tacks 5 are spaced from each other a distance suitable for receiving two strands of wicking, such as candle wicking. When the tacks or nails have been secured in position, the wicking or other suitable non-living fluid-transmitting material is wound up and down around the nails or tacks 5 of each row so as to form a continuous layer consisting of a multiplicity or plurality of strands of wicking extending up and down and across the portion 6 of the tree from which the bark has been removed. This wicking should be inserted in a space from which a freshly cut section of bark has been removed so that the edges of bark above and below the opening are freshly cut and well adapted for the ready transfer of natural fluids. However, there is a considerable time leeway after the bark is removed during which the process can be effectively carried out but after which it becomes less and less effective.

When this has been carried on to a sufficient extent to cover the entire section 6 from which the bark has been removed, tape 8 such for instance as dressmaker's tape or other suitable strip of material, is wound loosely around the vertical strands 7 of wicking, such tape forming preferably a continuous layer covering the portion 6 from which the bark has been removed and terminating adjacent or just at the shoulders 3 and 4, as illustrated in Figure 4.

Although tape is described as suitable and advantageous for the purpose of forming a sustaining layer, this layer for supporting and positioning the wicking or other fluid-transmitting layer may be formed of any other suitable material or substance for effecting the desired result, or may be accomplished in various and different ways, the taping being unnecessary and without substantial friction, except as a means for holding the wicking in place.

When this has been accomplished to maintain the strands 7 in position, the wicking is cut off at its upper and lower portions so that the upper ends of the separated wicks will just fit underneath the shoulder 3 and the lower ends of the separate wicks 7 will just fit in above the shoulder 4, thereby forming a continuous layer of separate strands of wicking, completely filling the space 6 from which the bark has been removed. The tacks or nails 5 are then removed. In this manner, there is formed a fluid-transferring layer or artificial bark consisting of a plurality of strands of non-living material substantially filling the space from which the natural bark has been removed and adapted to act as a substitute for the natural bark in the normal functioning of the tree.

Wicking has been described as illustrative of a suitable and convenient material for this layer because of its fluid-transmitting capacity by capillary attraction and its ready and easy adaptation to the formation of the layer as described, but any other non-living suitable fluid-transmitting material, such above-named cotton wicking or flax roving or linen strips having the same general capacity for transferring fluid by capillary attraction, may be used and so far as the resultant product is concerned, the layer may be produced in various other ways.

When this step or operation has been completed, it is preferable to wind wicking 9, or other suitable material such as a woven material of a fabric of desired characteristics, several times around the edges of the bark adjacent the shoulders 3 and 4 and above and below the layer 8 of tape. This winding 9 of wicking is effective in producing with the covering hereinafter described, an air-tight water-tight joint. Either before or after the layers 9 of wicking are wound upon the trees, it is quite essential that the vertical strands 7 of wicking are dampened or wet with water or suitable fluid acting perhaps as a primer. Thereupon, as illustrated in Figure 6, a loose covering of cloth such as cheesecloth, is wound around the tree covering the layers 9 of wicking and the tape layer 8.

This winding is preferably tight around wicking 9, but it is arranged loosely about the tape 8, which as above stated, is also loosely wound about the wicking 7. When this has been completed or at some previous time, the cheesecloth or other material of which the enclosure is formed, is rendered impervious to light, air, water and moisture by covering it or impregnating it with a water-proofing substance such as waterproof paint. Sufficient of this is applied to the upper and lower edges of the cheesecloth enclosure 10 to impregnate the wicking 9 and fill the interstices between the wicking and the bark or the wicking and the cheesecloth enclosure 10 to prevent the entry of light, air, water or moisture within the enclosure 10. The method is then completed and the product of this invention produced, as illustrated in Figure 7 and in broken away section, Figure 8.

In Figure 9, we have illustrated a tree or limb from which a section of the bark has been removed in a manner to provide a recess of V-shaped form at its top and bottom. Wicking 7 is closely fitted in this recess and is secured therein as by means of U-shaped staples 15 driven into the trunk of the tree at the opposite ends of the wicking. In this manner, the wicking is secured in position and the loosely wound tape 8 may be omitted.

Further, in Figure 9, in place of the cloth enclosure 10 treated with a water-proofing material, we have disclosed an enclosure 16 which may be formed of a transparent material such as cellophane, so that the operation of this process and the resultant natural changes may be visually inspected.

Further, it has been customary to inject medicine or dye into the tree and into openings formed therein permitting the tree thereafter, by the operation of nature, to disseminate and uniformly distribute the medicine or dye throughout the tree. The method herein described provides a more ready and efficient means for this purpose in that it is only necessary to place the medicine or dye upon the wicking, whereupon it will be distributed uniformly throughout the tree by nature's process. As it is desirable to keep sunlight from the bark surrounding the wound or girdle in the tree and from the wicking, a skirtlike member may be provided which surrounds the transparent enclosure 16, but is readily lifted to permit visual inspection.

We have found that the tree or limb which has been girdled or from which a section of bark has been removed, when treated in the manner herein described, not only will not die, but also will actually grow with added stimulus and the leaves will become larger and greener than normal.

Although we have shown and described specific steps in the method and specific materials used therein as perhaps preferable, we do not desire to restrict ourselves to the details of the method as described or the resultant product, as various modifications and changes may be made without departing from the spirit of the invention, as set forth in the appended claims.

We claim:

1. The method of treating a tree having a section of bark removed therefrom to leave spaced edges of bark comprising filling the space from which the bark has been removed with a plurality of vertically extending wicks, securing the wicks in position, providing edge portions of the bark above and below said space with a covering of an absorbent material, and surrounding the wicks and absorbent material with a water-proof air-tight jacket having its upper and lower edges secured to the respective absorbent material and extending beyond the exterior ends thereof.

2. The method of treating a tree having a section of bark removed therefrom to leave spaced edges of bark comprising providing the bark above and below the space from which bark has been removed with supporting members, winding wicking up and down around said supporting members, placing a securing member about the wicking over said space from which the bark has been removed, then cutting off the wicking adjacent the edges of the bark above and below said space so that the wicking will fit in said space.

3. The method of treating a tree having a section of bark removed therefrom to leave spaced edges of bark comprising providing the bark above and below the space from which bark has been removed with supporting members, winding wicking up and down around said supporting members, placing a securing member about the wicking over said space from which the bark has been removed then cutting off the wicking adjacent the edges of the bark above and below said space so that the wicking will fit in said space, and then providing the wicking with a water-proof jacket.

4. The method of treating a tree having a section of bark removed therefrom to leave spaced edges of bark which consists in providing supporting members adjacent the spaced edges, winding non-living fluid transmitting strands between said supports across said section in a direction parallel to the direction of normal flow of sap in the tree, placing a securing member about the strands over said space from which the bark has been removed, then cutting off the strands adjacent the edges of the bark above and below said space so that the remaining strands will fit in said space.

5. The method of treating a tree having a section of bark removed therefrom to leave spaced edges of bark which consists in providing supporting members adjacent the spaced edges, winding non-living fluid transmitting strands between said supports across said section in a direction parallel to the direction of normal flow of sap in the tree, placing a securing member about the strands over said space from which the bark has been removed, then cutting off the strands adjacent the edges of the bark above and below said space so that the remaining strands will fit in said space, and then providing a water-proof, air-tight coating over said strands and spaced edges of said bark.

6. The combination with a tree having a section of bark removed therefrom to leave substantially fresh cut spaced edges of bark, of a plurality of non-living strands for transmitting fluid by capillary attraction positioned in the space from which the bark was removed in a direction substantially parallel to the direction of normal flow of sap in the tree, means for maintaining said strands in position, and a water-proof, air-tight coating about said strands and extending over the cut edges of the bark.

7. The combination with a tree having a section of bark removed therefrom to leave substantially fresh cut spaced edges of bark, of a plurality of wicks for transmitting fluid by capillary attraction positioned in the space from which the bark was removed in a direction substantially parallel to the direction of normal flow of sap in the tree, means for maintaining said wicks in position, and a water-proof, air-tight coating about said wicks and extending over the cut edges of the bark.

8. The combination with a tree having a section of bark removed therefrom to leave substantially fresh cut spaced edges of bark, of a plurality of non-living strands for transmitting fluid by capillary attraction positioned in the space from which the bark was removed in a direction substantially parallel to the direction of normal flow of sap in the tree, tape wound loosely around said strands to keep them in position, and a water-proof, air-tight coating about said strands and extending over the cut edges of the bark.

9. The combination with a tree having a section of bark removed therefrom to leave substantially fresh cut spaced edges of bark, of a plurality of wicks for transmitting fluid by capillary attraction positioned in the space from which the bark was removed in a direction substantially parallel to the direction of normal flow of sap in the tree, tape wound loosely around said wicks to keep them in position, and a water-proof, air-tight coating about said wicks and extending over the cut edges of the bark.

THEODORE WILLARD CASE.
FRANK LE GRANDE COUCH.